(12) United States Patent
Goldberg et al.

(10) Patent No.: US 7,882,743 B2
(45) Date of Patent: Feb. 8, 2011

(54) METHOD AND SYSTEM FOR NOISE DOSIMETER

(75) Inventors: Jack Goldberg, San Diego, CA (US); Gregory A. Flamme, Portgage, MI (US); Dana S. Helmink, Elk Grove Village, IL (US); Mead C. Killion, Elk Grove Village, IL (US)

(73) Assignee: Broadcom Corp.

( * ) Notice: Subject to any disclaimer, the term of this patent is extended or adjusted under 35 U.S.C. 154(b) by 709 days.

(21) Appl. No.: 11/643,328

(22) Filed: Dec. 20, 2006

(65) Prior Publication Data

US 2007/0180915 A1  Aug. 9, 2007

Related U.S. Application Data

(60) Provisional application No. 60/752,761, filed on Dec. 20, 2005.

(51) Int. Cl.
*H04R 29/00* (2006.01)
*G01H 11/06* (2006.01)

(52) U.S. Cl. .............................. 73/647; 73/1.82; 381/58

(58) Field of Classification Search .................. 73/646, 73/647, 1.82, 866.5
See application file for complete search history.

(56) References Cited

U.S. PATENT DOCUMENTS

| | | | | |
|---|---|---|---|---|
| 3,802,535 A | * | 4/1974 | Peake et al. ................... | 73/646 |
| 4,003,264 A | * | 1/1977 | Erlandsson et al. ........... | 73/647 |
| 4,028,947 A | * | 6/1977 | Cowen ......................... | 73/647 |
| 4,073,194 A | * | 2/1978 | Willson et al. ................ | 73/646 |
| 4,102,208 A | * | 7/1978 | Betz ............................. | 73/647 |
| 4,277,980 A | * | 7/1981 | Coats et al. ................... | 73/646 |
| 4,287,771 A | * | 9/1981 | Dugot .......................... | 73/647 |
| 4,307,385 A | * | 12/1981 | Evans et al. ................. | 340/540 |
| 5,180,967 A | * | 1/1993 | Yamazaki .................... | 323/315 |
| 6,456,199 B1 | * | 9/2002 | Michael .................... | 340/573.1 |
| 7,058,190 B1 | * | 6/2006 | Zakarauskas et al. ........ | 381/122 |
| 2009/0272192 A1 | * | 11/2009 | Killion et al. ................. | 73/647 |

* cited by examiner

*Primary Examiner*—Jacques M Saint Surin
(74) *Attorney, Agent, or Firm*—McAndrews, Held & Malloy, Ltd.

(57) ABSTRACT

A personal noise dosimeter having functionality for increasing the dynamic range of the device. A microphone provides a signal to an RMS detector, which provides a DC signal to a two-stage amplifier circuit. The outputs of the amplifiers are provided to a processor having multiple A/D channels. The processor calculates accumulated noise doses and drives a display, which in one embodiment includes a panel of light-emitting diodes. A current source injects current into the output of the RMS detector to reduce performance degradation. Functionality detects and accounts for voltage offsets in the dosimeter. The microphone is turned off during offset determination. In one embodiment, the dosimeter includes functionality for control of external devices such as sound boards.

20 Claims, 10 Drawing Sheets

METHOD AND SYSTEM FOR NOISE DOSIMETER

CROSS-REFERENCE TO RELATED APPLICATIONS/INCORPORATION BY REFERENCE

The present application claims priority under 35 U.S.C. §120 to provisional application 60/752,761, filed on Dec. 20, 2005, the entire contents of which are hereby expressly incorporated herein by reference.

FIELD OF THE INVENTION

Certain embodiments of the invention relate to noise monitoring. More specifically, certain embodiments of the invention relate to a method and system for a personal noise dosimeter.

BACKGROUND OF THE INVENTION

A noise dosimeter is a device which incorporates a sound level measurement subsystem and a methodology for accumulating the sound level over time. ANSI S.125-1991 is the current American National Standard Specification for Personal Noise Dosimeters, a comprehensive standard that describes how a standard noise dosimeter should function. The result of a noise dose measurement over time may be what is known as the "equivalent continuous sound level", denoted as $L_{eq}$. A noise dose might also be expressed as a percentage of "criterion exposure." The "criterion sound level", for example 85 dB, is the level of sound, which having been applied continuously for a duration equal to the "criterion time," for example 8 hours, results in a 100% criterion exposure. These calculations are completely specified in the standard and are well known in the industry.

Many environments expose individuals to excessively loud sounds. These loud sounds include, for example, music concerts, industrial manufacturing environments, construction and environments involving the use of heavy machinery, etc. The US government regulates, through OSHA (Occupational Safety and Health Administration), noise exposure levels in work environments. There are many noise dosimeters on the market, which are used to monitor noise in the work environment. These regulations and devices represent a level of protection for many American workers.

There are other environments, in which loud noises exist, that are far less regulated. Therefore, the development of a low cost noise dosimeter is needed to provide individuals or organizations with an inexpensive and simple means of monitoring noise exposure.

Existing devices used for measuring loud noises have several problems. For example, existing devices tend to be too complicated for operation by the average user, and they are generally too expensive for the average user, in that they are primarily designed for use by technically trained personnel in an industrial environment, which is reflected in their cost and complexity. Additionally, existing devices can be inappropriate to wear in most social occasions and situations. Existing devices may also have insufficient accuracy, precision and/or flexibility.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a personal noise dosimeter, substantially as shown in and/or described in connection with at least one of the figures, as set forth more completely in the claims.

One embodiment of the present invention is directed towards a noise dosimeter having an RMS detector and a current source. The RMS detector receives an AC signal representing an acoustic signal, converts the AC signal to a DC signal, and provides the DC signal at an output of the RMS detector. The current source operable to inject current into the output of the RMS detector.

Another embodiment of the present invention is directed to a method of determining an offset voltage in a noise dosimeter having a microphone that provides an AC signal to an RMS detector, which converts the AC signal to a DC signal. Pursuant to the method, the microphone is turned off when an offset is to be determined. A signal that is representative of an output of the RMS detector is measured while the microphone is turned off.

Another embodiment of the present invention is directed to a noise dosimeter having an RMS detector, first and second amplifier, and a processor. The RMS detector receives an AC signal representing an acoustic signal, converts the AC signal to a DC signal, and provides the DC signal at an output of the RMS detector. The first amplifier receives the output of the RMS detector and amplifies signals of all levels. The second amplifier receives an output of the first amplifier and amplifies relatively lower level signals. The processor comprises an analog-to-digital converter (A/D) having multiple channels. A first A/D channel receives an output of the first amplifier. A second A/D channel receives an output of the second amplifier. The processor calculates an accumulated noise dose based on the outputs of the analog-to-digital converter.

Another embodiment of the present invention is directed to a noise dosimeter having functionality that measures an accumulated noise dose over time, and an interface that communicates information regarding an accumulated noise dose to a second device.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a personal noise dosimeter. More specifically, the present invention relates to a noise monitoring system and method for continuously and accurately monitoring an individual's noise exposure.

The personal noise dosimeter of the present invention may be inexpensive and provide adequate performance to the user. Some of the parameters used to evaluate the personal noise dosimeter may be its cost, size, battery life, and performance. A balance of these parameters may be achieved to arrive at a useful device. Calculation of the noise dose in the present invention may be consistent with ANSI S1.25-1991, as shown below:

| | |
|---|---|
| Exchange rate | 3 dB |
| Criterion level | 85 dB |
| Threshold level | 80 dB |
| Criterion time | 8 hrs |
| Frequency weighting | A |
| Time weighting | Slow |

Flexibility in the dosimeter design may allow exchange rates of 3, 4, or 5 dB; criterion levels of from 75 to 90 dB, and threshold levels of from 75 to 85 dB.

Figure 1:
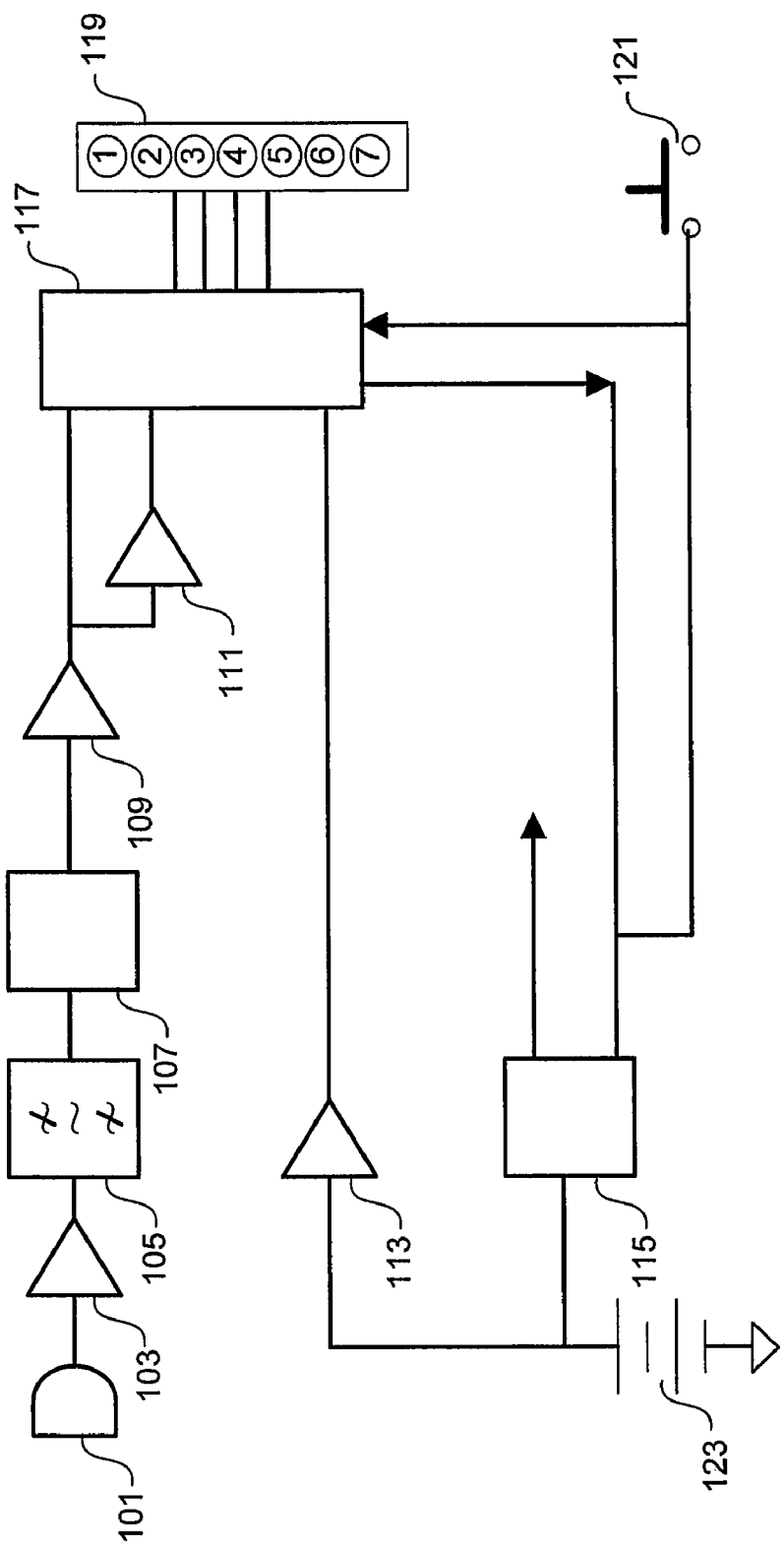
FIG. 1 illustrates a block diagram of an exemplary noise dosimeter system, in accordance with an embodiment of the present invention.

FIG. 1 illustrates a block diagram of an exemplary noise dosimeter system, in accordance with an embodiment of the present invention. The noise dosimeter system comprises a microphone 101, a filter 105, a root mean square (RMS) detector 107, a microprocessor 117, a power source 123, a pushbutton 121, and a display 119. The system may additionally comprise several amplifiers 103, 109, 111, and 113, and a voltage regulator 115.

The power source 123 may be, for example, batteries. In an embodiment of the present invention, three AAAA alkaline batteries are used as the power source 123. These batteries may provide the noise dosimeter with battery life as long as 250 hours.

The microprocessor 117 comprises program memory, data memory, an analog to digital converter, timers, a clock oscillator, and various lines for input and output. The program memory contains the dosimeter firmware, which is the computer program operates the dosimeter and performs computations.

The display 119 may comprise, for example, a number of LEDs (light emitting diodes). A pattern of blinking or duration of the LEDs may be indicative of different activities and functionalities occurring in the noise dosimeter such as, for example, an error. When an error occurs in the noise dosimeter, the display 119 may flash LEDs 1 and 3, and LEDs 2 and 4 three times, for example, as an error indication and then turn off.

The noise dosimeter may operate in two modes: a normal (NORMAL) mode and a calibration (CAL) mode. Operation in NORMAL mode may be initiated by pressing and releasing the pushbutton 121 and may be carried out by the user of the noise dosimeter. Operation in CAL mode may be initiated by pressing and holding the pushbutton 121 for a few seconds, then releasing it. The CAL mode may be used for checking the calibration of the noise dosimeter or recalibrating the noise dosimeter. The calibration may be carried out by a manufacturer of the noise dosimeter or a service technician.

The noise dosimeter begins operating in a NORMAL mode by pressing and releasing the pushbutton 121. LED7 may be lit while the pushbutton 121 is depressed. If the power source 123 is not weak or dead, immediately after releasing the pushbutton 121, LEDs 1 through 6 flash. If the power source 123 is weak, for example less than 3.5V, the unit may show the error indication as a warning when the pushbutton 121 is released and then start up, flashing LEDs 1 through 6 in succession. If the power source 123 is "dead", for example less than 3.2V, the unit may show the error indication twice in succession and then turn off.

During an initial period of NORMAL mode operation, for example 20 seconds, the instrument self-checks and LED 1 may slowly blink. Alternatively, the display may indicate during an initial period the result of the previous noise dose measurement. During this initial period the system firmware may measure two internal offset voltages. Knowledge of the internal offset(s) may allow the dosimeter to work more accurately over a wider dynamic range. If during the self-check an error occurs, the dosimeter may show the error indication and turn off. Additionally, during the initial period of operation, the dosimeter may be turned off by pressing and releasing the pushbutton 121.

After the initial period of operation, if no errors occur and the dosimeter is not turned off, the dosimeter actively accumulates noise dose. Noise dose accumulation continues until the user presses and holds the pushbutton 121 for a short period, for example 3 seconds, or a certain amount of time of operation has elapsed, for example 16 hours. The display 119 may indicate accumulated noise dose as described by Table 1 below. In an illustrative embodiment of the present invention, LEDs 1 and 2 are green, LED 3 is yellow and LEDs 4-7 are red. Thus when the accumulated dose is less than 100%, the LED that is lit (or blinking) is green, when the accumulated dose is between 100% and 200%, the LED that is lit is yellow, and when the accumulated dose is more than 200%, the LED that is lit is red. This quickly, clearly and inexpensively communicates information to the user regarding the accumulated noise dose. Other noise dose levels and LED combinations can also be used to achieve these objectives.

TABLE 1

NORMAL mode display options

| | |
|---|---|
| <25% dose | slow blink LED 1 (once every ~1.3 secs) |
| 25%-50% dose | blink LED1 (once every ~.65 secs) |
| 50%-100% dose | blink LED 2 |
| 100%-200% dose | blink LED 3 |
| 200%-400% dose | blink LED 4 |
| 400%-1600% dose | blink LED 5 |
| 1600%-3200% dose | blink LED 6 |
| >3200% dose | blink LED 7 |

The dosimeter, while in NORMAL mode, may save data in its memory representative of the present accumulated noise dose every few minutes, for example, every 8 minutes. The saved data of the noise dose may be downloaded to a computer. Up to 16 hours of data (120 dose values or 240 bytes) may be stored in the dosimeter, and this data may indicate the accumulated noise dose to a resolution of better than 0.1% in the range of 0 to approximately 12800%. Other data that may be downloaded to a computer may be, for example, the firmware revision level, the exchange rate, the criterion level, the threshold level, and the internal calibration values.

The noise dosimeter begins operation in the CAL mode by pressing the pushbutton 121 and holding it down for a short time, for example 4 seconds. When the pushbutton 121 is pressed, LED7 is lit. When a short time, approximately 4 seconds, has elapsed, LED7 may flash to indicate entry into the CAL mode. The dosimeter then operates in the CAL mode after the pushbutton is released while LED7 is flashing.

If the power source 123 is weak, for example less than 3.5V, the unit may show the error indication as a warning when the pushbutton 121 is released and then start up, flashing LEDs 1 through 6 in succession. If the power source 123 is "dead", for example less than 3.2V, the unit may show the error indication twice in succession and then turn off.

During the CAL mode, the dosimeter functions like a sound level meter with 5 dB resolution and a range of from 70 dB to 130 dB SPL. When the sound pressure level as measured by the dosimeter is 94 dB±1.5 dB, LEDs 3 and 4 both flash. This flashing pattern may be utilized to check the dosimeter calibration. CAL mode may be also used during manufacturing and service of the dosimeter to adjust the sensitivity of the microphone 101 or for other calibration tasks.

During an initial period of CAL mode operation, for example 20 seconds, the instrument self-checks and LEDs 1 through 6 may repeatedly flash in succession. During this initial period the system firmware may measure two internal offset voltages. Knowledge of the internal offset(s) may allow the dosimeter to work more accurately over a wider dynamic range. If during the self-check an error occurs, the dosimeter may show the error indication and turn off. The dosimeter may also be turned off anytime during CAL mode operation by pressing and releasing the pushbutton 121. Following self-check, the dosimeter may display sound level as described by Table 2 below.

TABLE 2

CAL mode display options

| | |
|---|---|
| less than 72.5 dB | LED1 |
| 72.5 to 77.5 dB | LED1 + LED2 |
| 77.5 to 82.5 dB | LED2 |
| 82.5 to 87.5 dB | LED2 + LED3 |
| 87.5 to 92.5 dB | LED3 |
| 92.5 to 95.5 dB | LED3 + LED4 blinking together |
| 95.5 to 97.5 dB | LED3 + LED4 |
| 97.5 dB to 102.5 dB | LED4 |
| 102.5 dB to 107.5 dB | LED4 + LED5 |
| 107.5 dB to 112.5 dB | LED5 |
| 112.5 dB to 117.5 dB | LED5 + LED6 |
| 117.5 dB to 122.5 dB | LED6 |
| 122.5 dB to 127.5 dB | LED6 + LED7 |
| greater than 127.5 dB | LED7 |

Figure 2:
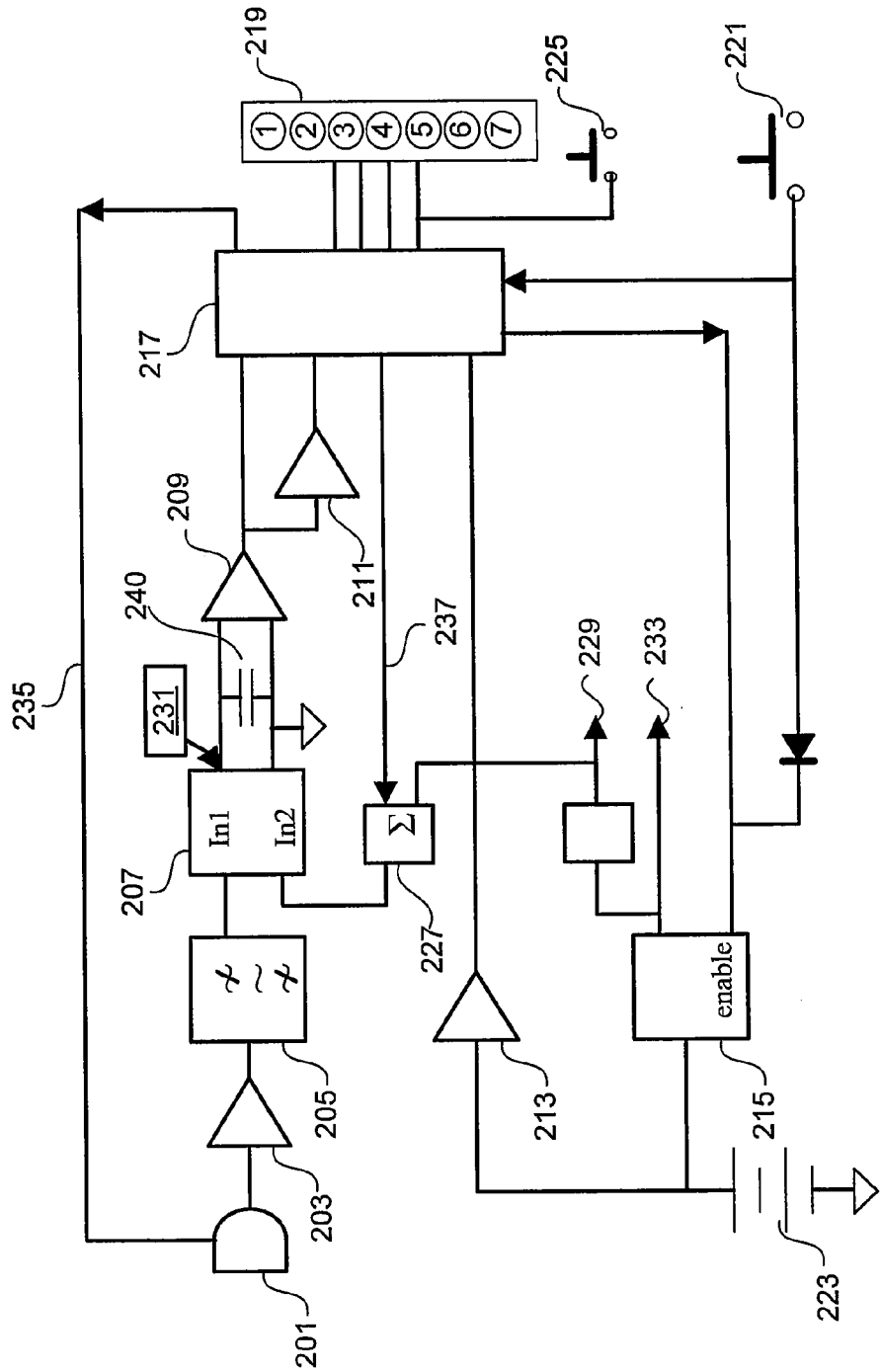
FIG. 2 illustrates a block diagram of exemplary circuitry of the noise dosimeter, in accordance with an embodiment of the present invention.

FIG. 2 illustrates a block diagram of exemplary circuitry of the noise dosimeter, in accordance with an embodiment of the present invention. In this embodiment, the noise dosimeter circuitry comprises a microphone 201, an input amplifier 203, an A weighting filter 205, an RMS detector 207, a capacitor 240, two DC amplifiers 209 and 211, one amplifier 209 for amplifying signals of all levels and the other amplifier 211 for amplifying lower level signals, a microcontroller 217, a LED display 219, a power source 223, a voltage regulator 215, and pushbuttons 221 and 225. The microcontroller 217 comprises an integral analog-to-digital converter and integral memory for program and data storage. The LED display 219 comprises 7 LEDs. The power source 223 comprises batteries. The pushbutton 221 is user-accessible, whereas, the pushbutton 225 may not be user-accessible, and may be only accessible to manufacturing or service personnel for calibration purposes.

An acoustic signal is captured by the microphone 201, amplified by the amplifier 203, and filtered by the A weighting filter 205. The RMS detector 207 then processes the signal. The time constant of the RMS detector is determined by a capacitor 240. The slow-moving DC output of the RMS detector 207 is then amplified in two stages. The first stage, amplifier 209, amplifies signals of all levels, and in another stage, the low level signals may be amplified by the amplifier 211. The outputs of the amplifiers 209 and 211 are then applied to two input channels of the microcontroller 217. The two inputs are sent to the integral analog to digital converter within the microcontroller 217. The microcontroller then processes the RMS-detected and amplified signals and outputs the results to an array of seven LEDs of the display 219.

The circuitry may also comprise hardware control for measurement of offsets, the injection of a small amount of current into the output terminal of the RMS detector, the generation of the 1.5V virtual ground, and an A/D channel for checking the battery strength.

Firmware stored in the microcontroller memory may include algorithms to substantially minimize the effect of the offsets on noise dose measurements.

The power source 223 may, for example, be 3 AAAA batteries. A regulator 215, which is enabled or disabled with a logic signal from the microcontroller 217, regulates the power source 223. The regulator 215 may be, for example, a 3-volt regulator. For audio signal processing, virtual ground reference 229 of, for example 1.5V, is generated and used in both the input amplifier 203 and the A weighting filter 205 stages. The 1.5-volt virtual ground 229 is connected to summer 227 and then to the second input, IN2 of the RMS detector 207, acting as the reference for the audio signal being input at the first input, IN1. The power source 223 is connected to operational amplifier 213, which both isolates the battery from the microcontroller and adjusts the battery voltage to be a proper level for detection by the A/D channel of the microcontroller 217 for checking the battery strength. The microcontroller 217 checks the strength of the power source 223 at startup and indicates whether the battery is weak (in which case the system will start up with a warning) or dead (in which case the system will not start up). Pressing the user-accessible pushbutton 221 causes the circuitry to turn on by enabling the regulator 215. Thereafter an output from the microcontroller 217 may continue to enable the regulator 215 or turn off the circuitry.

The RMS detector 207 converts an AC signal at its input to a slow-moving DC output signal at a level equal to the root-mean-square value of the input. For example, RMS detector, model LTC1966 manufactured by Linear Technology may be utilized. Linear Technology specifies that the LTC1966 exhibits constant bandwidth independent of input voltage, better than ±1.5 dB to 10 KHz; better than 0.1% linearity; high accuracy of better than 0.25% from 50 Hz to 1 KHz; a dynamic range of greater than 40 dB; and low supply current of less than 200 μa. The maximum differential input voltage at the detector is 1 volt. At 200 mV input, a crest factor of 4 causes negligible error.

If the output of the RMS detector 207 is too small, performance may degrade. An embodiment of the noise dosimeter of the present invention avoids this problem by injecting a small amount of current, using a current source 231, into the output of the RMS detector 207. This small amount of current forces the output of the RMS detector 207 to be large enough to avoid the region near zero, thus minimizing uncalibratable errors. Additionally, the offsets created by the current injection and due to other causes may be measured and corrected. The noise dosimeter of the present invention, by virtue of its correction for the offset errors which can occur at small output levels, has a dynamic range of approximately 60 dB.

The microphone 201 may operate using a regulated 3V supply 233. One exemplary microphone 201 has a diameter equal to 4.5 mm, exhibits a flat frequency response to better than ±1 dB from 100 Hz to 15 KHz, and is omni-directional. The nominal microphone sensitivity in this embodiment is −44 dB±4 dB re 1V for 94 dB SPL at 1 kHz. Thus, for example, an input at 130 dB SPL, a desired upper limit for the design, the microphone output will be −8 dB re 1V nominally, or about 400 mV RMS.

In an embodiment of the present invention, the gain between the microphone output and the RMS detector input is approximately +5 dB. The amplifier 203 may have a gain of approximately 8 dB, the network preceding the amplifier may have a loss of about 0.2 dB at 1 KHz and the passive filter following the first stage may have a loss of about 2.7 dB at 1 KHz. The manner in which the A-weighting frequency characteristic may be implemented is discussed hereinafter.

Using a nominal microphone (−44 dB sensitivity), for example, a 130 dB SPL input at 1 Khz results in an RMS signal of (130−94)−44+5 or −3 dB re 1V at the detector input. Thus, a 130 dB SPL input to the noise dosimeter results in a signal at the detector of 1V peak (2V peak to peak).

The output of the RMS detector 207 may drive two DC amplifier stages with amplifiers 209 and 211, with both amplifier outputs connected to the multiplexed analog-to-digital converter that is included in the microcontroller. The first amplifier 209, for example, has a gain of about 4.24× and the second amplifier 311 has a gain of 32×. The nominal top of scale level at the detector output (130 dB SPL with nominal mic) results in a detector output of 0.707VDC, which when amplified 4.24 times results in a 3V level at the A/D input. If the microcontroller is powered by 3V, this is the maximum level that can be sampled by the high A/D channel.

The second DC amplifier stage 211 further amplifies the first DC amplifier stage output by a factor of 32×. The second stage output may be connected to the low A/D channel, which in an embodiment of the invention saturates at approximately 99.9 dB SPL input in a unit having a microphone of nominal sensitivity.

A gain of 32× in the second DC amplifier is chosen to simplify the calculations in the microcontroller in that 32 is a power of 2. A different power of 2, for example, 16 or 64, may be utilized in an embodiment of the invention. Choice of the gain of the second DC amplifier is based on the measurement resolution requirements and resolution of the A/D converter.

A-weighting filtering 205 may be achieved with a 6-pole passive filter, for example. In an embodiment of the invention all of the poles are on the real axis with four of them performing a high-pass function and two of them performing a low-pass function. The pole locations may be placed approximately where specified in, for example, ANSI S1.4 as follows:

Two high pass poles at 20.6 Hz;
one high pass pole at 107.7 Hz;
one high pass pole at 737.9 Hz; and
two low pass poles at 12.2 KHz.

The noise dosimeter may achieve its frequency weighting by incorporating passive circuitry at the microphone output for one of the 12.2 KHz low pass poles and one of the 20.6 Hz high pass poles. The remaining four poles may be realized with a passive network between the output of the amplifier 203 and the input of the RMS detector 207.

The microcontroller 217 used in the design may, for example, be the PIC16F684 manufactured by Microchip Technology. That microcontroller is a 14-pin, low-power, 8-bit RISC type processor with an integral 10 bit A/D converter, an integral clock which is factory calibrated to ±1%, several timers, a 256 byte EEPROM, 2K instructions of flash program memory and 128 bytes of RAM. This microcontroller's configuration is extremely flexible and in the noise dosimeter of the present invention, 3 channels of A/D input may be utilized (two for the RMS detector 207 output and 1 for the battery strength check), 4 input-output lines for controlling the display 219 (one of which may serve the purpose of detecting pushbutton 225 during calibration), 1 input line for reading the user-accessible pushbutton, 1 output line for controlling the power supply, and 2 input-output lines used to enable calibration and correction at low input levels.

In this embodiment, four output lines of the microcontroller 217 drive seven LEDs of the display 219. The arrangement of these LEDs may be such that in some cases two of them can be driven simultaneously and continuously. When the firmware rapidly multiplexes between driving one of the LEDs and driving another, the appearance of any two LEDs being turned on simultaneously can be achieved.

In the NORMAL mode of operation, the display 219 may indicate eight distinct levels of noise exposure, as shown above in Table 1. In the CAL mode of operation, used for calibration and diagnostic checking of the instrument, the display 219 may indicate input sound level from 70 dB to 130 dB in 5 dB increments, as shown above in Table 2.

A 10-pin connector may be utilized with the noise dosimeter to achieve several purposes. First, the noise dosimeter system may be powered from a remote supply of 3.5 to 5 volts DC using the connector. Second, the microcontroller may be programmed via the connector with a properly configured cable and programmer, an example of which is the Microchip MPLAB ICD2. Third, data stored during normal operation of the dosimeter may be accessed via the connector and a properly configured cable and interface. Fourth, the connector may enable adjustment of the calibration of the dosimeter with automated equipment to account for the unit-to-unit variability of the microphone sensitivity, for example. Fifth, the connector may be used to interface the dosimeter printed circuit board to other equipment, such as a public address system.

Programming the microcontroller 217 may be accomplished using the power and ground connections to the microcontroller 217 along with three of its other pins. These same connections may be used to read the internal EEPROM, which may store the noise dose data gathered during NORMAL mode operation. The structure of the data stored in EEPROM is described hereinafter.

In addition to the +3V power line, ground, a line for supplying remote power and the three control lines for reading and writing the microcontroller memory, four other lines are present at the 10-pin connector. These four lines are the input-output lines that control the display 219. One of these four lines may allow the adjustment of the system gain to account for the microphone sensitivity. By connecting this line to +3V, duplicating the action of pushbutton 225 in this embodiment, while the instrument is in CAL mode and while the instrument is being exposed to a reference level of 94 dB SPL, a technician or an automated calibration system may adjust the device's internal gain.

The four lines that control the display 219 may be used to control another instrument or provide real-time data regarding accumulated noise dose to another instrument, such as a public address system or mixing console. For example, a sound board at a musical concert may be interfaced to the dosimeter printed circuit board such that when the noise dose is excessive, the operator may be made aware that the sound has been too loud for too long and/or the sound board could automatically turn down in response to the increasing noise dose.

The noise dosimeter of the present invention may include hardware features and accompanying firmware capabilities that may avoid some limitations of the performance of the RMS detector such as, for example, the LTC1966. These hardware features and accompanying firmware capabilities work together to extend the usable dynamic range of the RMS detector 207. First, a current source 231, injects a small amount of current, for example 20 nA, into the output of the detector. Current source 231 may comprise a resistor network. Second, the microcontroller 217 may switch on and off the power to the microphone 201 via the connection 235, thus eliminating acoustic signals from interfering with the calibration process. Third, an additional input offset, in the form of a DC bias, may be applied to the RMS detector 207 by means of a control line to summer 227. These three steps may allow the noise dosimeter to substantially correct for errors related to small input signals and thus substantially increase the detector's dynamic range.

The current source utilized at the output of the RMS detector 207 in the noise dosimeter injects a small current of about 20 nA, for example. As a result, there may be both an additional output offset and an additional input offset created at the RMS detector 207. The LTC1966 has both inherent input and output offset errors, which vary unit-to-unit and when the output voltage is very small (close to ground), the LTC1966 becomes highly nonlinear and non-monotonic in an unpredictable manner. When configured, as in this noise dosimeter design, with 20 nA injected into its output, the response for small signals becomes monotonic although some nonlinearity remains. The effect of this remaining nonlinearity on the performance of the RMS detector and thus on the accuracy of noise dose measurements is substantially predictable and calibratable.

In an embodiment of the invention, the input and output offsets of the RMS detector 207 may be measured in the noise dosimeter design at the start of every measurement cycle. To accomplish this, the microphone is disabled thus eliminating any acoustic input signal would appear at the input of the detector. To disable the microphone, the microphone power is switched on and off with a dedicated output line 235 from the microcontroller 217 and, while the offsets are measured, the microphone power is off.

A positive offset at the input the RMS detector 207 may be established by using another dedicated output line 237 from the microcontroller 217. When this line is set to logic high (+3V), IN2 of the RMS detector 207 is moved from its normal level at virtual ground (1.5V) to approximately 1.52V.

Figure 3:
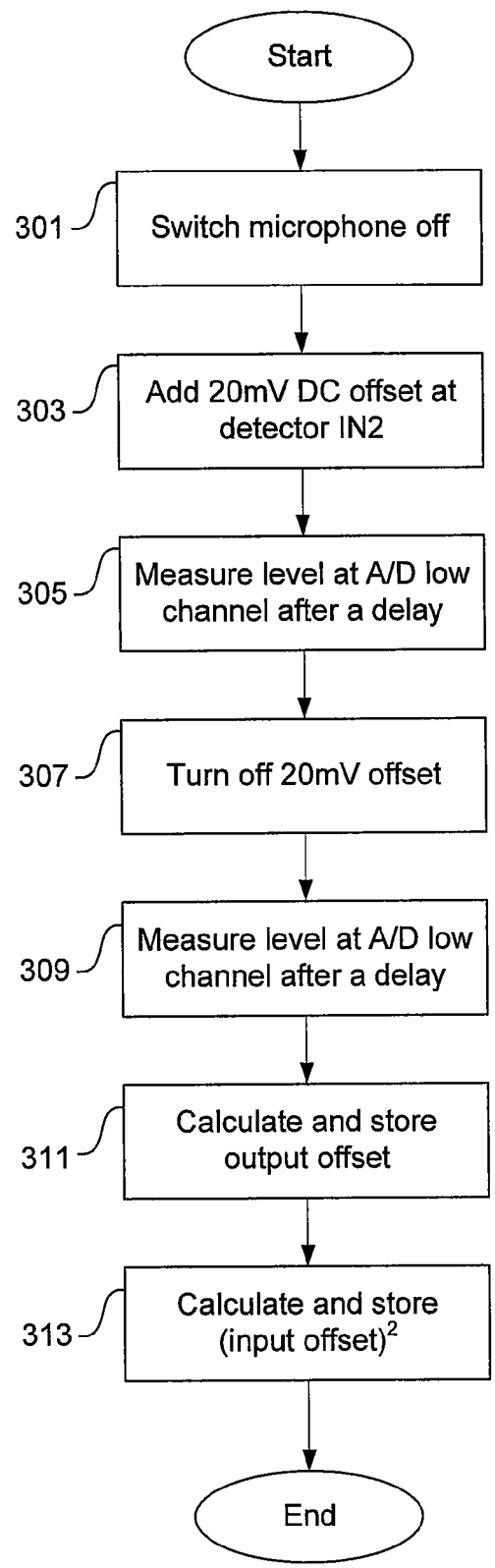
FIG. 3 illustrates a flow chart of an exemplary method for measuring input and output offsets of the RMS detector, in accordance with an embodiment of the present invention.

FIG. 3 illustrates a flow chart of an exemplary method for measuring input and output offsets of the RMS detector, in accordance with an embodiment of the present invention. At an initial step 301, the microphone 201 is switched off. The detector IN2 is then set to 1.52V, 20 mV greater than virtual ground, at the next step 303. The level is then measured at the A/D low channel after a delay, at a following step 305. The 20 mV DC offset voltage at detector IN2 is then turned off at a next step 307, and the output of the RMS detector is then again measured at the A/D low channel after a delay at a following step 309. The output offset is then calculated and stored at a next step 311, and (input offset)$^2$ is calculated and stored at a next step 313. Some exemplary things that may cause offset voltage (DC offset) in the noise dosimeter may be the inherent output offset of the RMS detector itself; the effect due to the presence of the current injected into the detector output; and the offsets of the two op amp stages of DC-coupled amplification which follow the RMS detector.

Referring to FIG. 3, to clarify the calculation of the output offset at step 311, first assume that the three aforementioned causes for offset are negligible. In such a case, the voltage measured by the A/D converter at step 305 would be 20 mV times the gains of the two DC amplifier stages (4.24 and 32) or approximately 2.7V. However, if the output offset voltage caused by the three sources listed above is not negligible, the actual voltage measured at step 305 may differ from the ideal 2.7V by an amount representative of the output offset voltage. Step 311 computes the output offset as the measurement of step 305 minus the digital level corresponding to the ideal 2.7V.

The input offset is an equivalent DC error at the RMS detector input caused by its inherent input offset plus the impact of the current injection at its output terminal. Once the output offset is computed at step 311, the input offset may be computed as being the level read at the low channel A/D input at step 309 minus the output offset. At step 309, there is no microphone signal (IN1=virtual ground) and there is no offset at IN2 of the detector (IN2=virtual ground); thus, if there were no output or input offset voltages, the voltage measured at step 309 would be zero.

When an input offset exists, the detector behaves as though it is measuring the AC-coupled audio signal plus a DC signal equal to the input offset. When an output offset is also present, the output offset is also added to the result. RMS detection is such that the result of such a measurement will be as shown in Equation 1 below:

$$\text{MeasuredOutput} = \text{OutputOffset} + \text{SQRT}(\text{InputOffset}^2 + \text{TrueInputRMS}^2) \quad (1)$$

Whenever the level at the A/D converter is small enough such that the input offset is significant, the dosimeter firmware calculates the TrueInputRMS as shown in Equation 2, which can be derived directly from Equation 1:

$$\text{TrueInputRMS} = \text{SQRT}[(\text{MeasuredOutput} - \text{OutputOffset})^2 - \text{InputOffset}^2] \quad (2)$$

In an embodiment of the invention, there are two modes of operation of the noise dosimeter. When the noise dosimeter is operating in NORMAL mode, the noise dosimeter measures and displays the accumulated Noise Dose. When the noise dosimeter is operating in CAL mode, usually during manufacturing or service, the GAIN CORRECTION to accommodate for the variability in unit-to-unit microphone sensitivity is adjusted. CAL mode may also be used to check the calibration of the noise dosimeter. To enter NORMAL mode, the user simply presses and releases the pushbutton 221. To enter CAL mode, the user (manufacturing or service personnel) presses and hold the pushbutton 225 for about 4 seconds before releasing it.

In both NORMAL and CAL modes, the microcontroller 217 may use its internal oscillator and a clock. When the noise dosimeter starts up, the clock frequency may be set to 125 KHz and the clock may remain at 125 KHz during the "startup routine." Startup may perform various functions including checking the battery health, measuring and storing the offset errors, and reading and writing various EEPROM locations. Following startup, in NORMAL mode, the clock may remain at 125 KHz (31.25 KHz instruction rate) and in CAL mode the clock may change after startup. In an embodiment of the invention, a more rapid clock is utilized in CAL mode to ensure a proper looking display.

The microcontroller 217 used in the design may, for example, be the PIC16F684 manufactured by Microchip Technology. There are three timer/counters in the PIC16F684, and they are labeled TIMER0, TIMER1 and TIMER2. TIMER0 and TIMER2 are both 8-bit counters and TIMER1 is a 16-bit counter. TIMER1 may be used to time the initial press of the pushbutton to determine whether the system should enter NORMAL or CAL mode.

The interrupt associated with TIMER0 may be enabled. In an embodiment of the invention, in NORMAL mode, TIMER0 creates $2^{17}$ interrupts during an 8-hour period of time, for example, which is equivalent to one interrupt approximately every 220 msec. Every time an interrupt occurs in NORMAL mode, the noise dosimeter system samples the detected level and updates its accumulated dose. The interrupt routine also keeps track of the overall time so that the unit automatically turns itself off after 16 hours, if the user does not do so before then.

In an embodiment of the invention, in CAL mode TIMER0 creates an interrupt once approximately every 0.52 seconds. CAL mode firmware keeps track of the interrupts to automatically turn off the unit after approximately 18 minutes.

Figure 4:
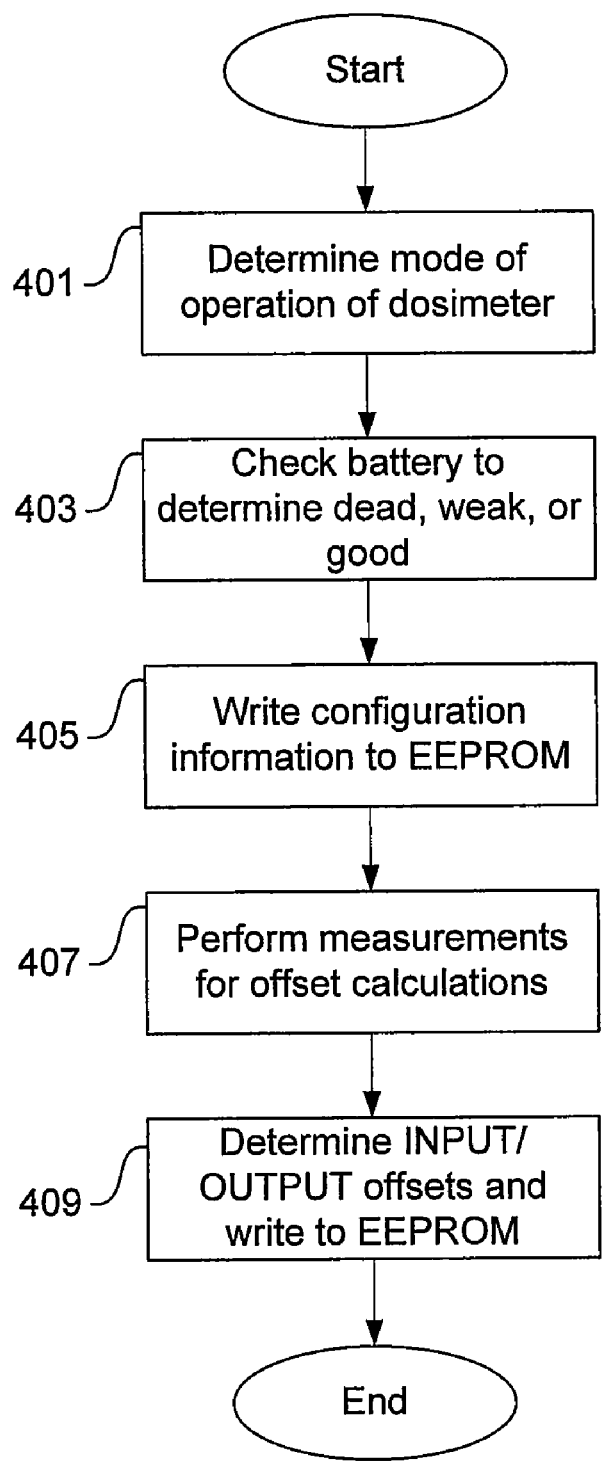
FIG. 4 illustrates a flow chart of an exemplary noise dosimeter startup sequence, in accordance with an embodiment of the present invention.

FIG. 4 illustrates a flow chart of an exemplary noise dosimeter startup sequence, in accordance with an embodiment of the present invention. At an initial step 401, it is determined whether the mode of operation of the noise dosimeter is NORMAL or CAL mode. At a next step 403, the battery is checked to determine whether it is good, weak, or dead. Configuration information is written to the EEPROM of the microcontroller at a next step 405. At a following step 407, two measurements are performed to determine INPUT and OUTPUT offsets. The INPUT and OUTPUT offsets are calculated and written to EEPROM at a next step 409. The startup sequence is explored in more detail hereinafter.

Figure 5A:
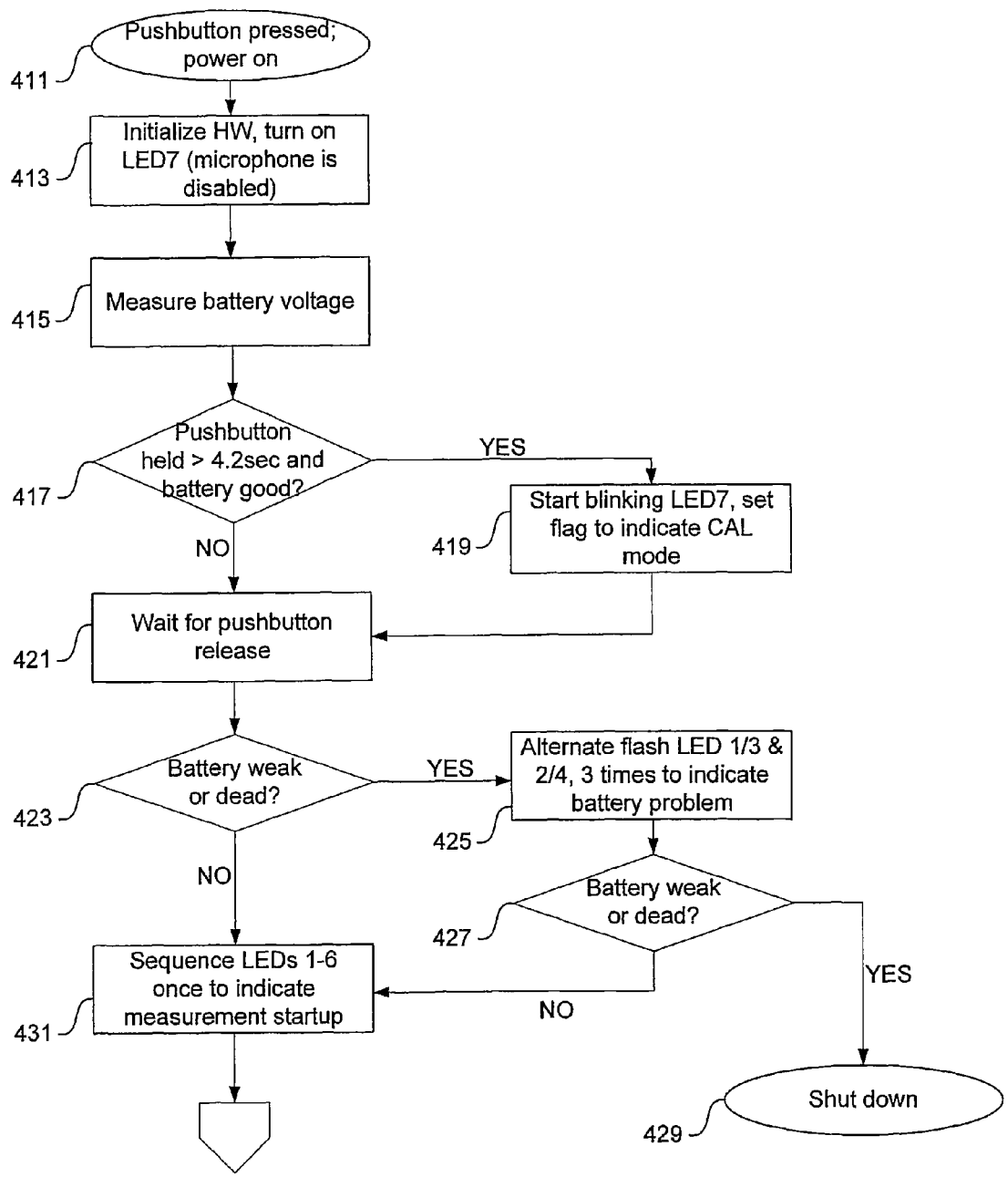
FIG. 5A illustrates a flow chart of an exemplary first part detailed noise dosimeter startup sequence, in accordance with an embodiment of the present invention.

FIG. 5A illustrates a flow chart of an exemplary first part detailed noise dosimeter startup sequence, in accordance with an embodiment of the present invention. During a first part of the noise dosimeter startup sequence, the noise dosimeter is powered up, the battery is checked, and it is determined whether the noise dosimeter is to operate in NORMAL or CAL mode. Referring to FIG. 5A, the noise dosimeter is powered up at an initial step 411 by pressing the pushbutton. The hardware is then initialized and startup is indicated by turning on LED7 on the display 219 at a next step 413. The battery voltage is then measured at a next step 415. If the voltage is less than a predetermined value, for example 3.2V, the battery is determined to be "dead;" if the voltage is greater than another predetermined value, for example 3.5V, the battery is determined to be "good;" and otherwise, the battery is determined to be "weak." At a next decision block 417, it is determined whether both the pushbutton was held more than 4.2 seconds and the battery was determined "good." If the pushbutton was held more than 4.2 seconds and the battery is "good," LED7 starts blinking and a flag is set to indicate CAL mode at a next step 419. If the pushbutton was not held more than 4.2 seconds or the battery is not "good," LED7 does not start blinking. The system then waits for the pushbutton to be released at a next step 421. At a next decision block 423, it is determined whether the battery is "weak" or "dead," and if it is either "weak" or "dead", LEDs 1 and 3, and LEDs 2 and 4, alternatively flash 3 times to indicate a battery problem at a next step 425. It is then determined whether the battery is "dead" at a next decision step 427. If the battery is determined to be "dead," the noise dosimeter is shut down at a block 429.

Note that at startup both the microphone is disabled so that no acoustic input interferes with the offset measurements which follow and the detector input IN2 is set to approximately 20 mV greater than virtual ground. Offset measurements are described in further detail below.

If it is determined at the decision block 423 that the battery is not "weak" or "dead," or if it is determined at the decision block 427 that the battery is not "dead", LEDs 1 through 6 are turned on in sequence once to indicate measurement startup at a next block 431. The startup sequence then proceeds to the second part of the noise dosimeter startup sequence, described hereinafter.

Figure 5B:
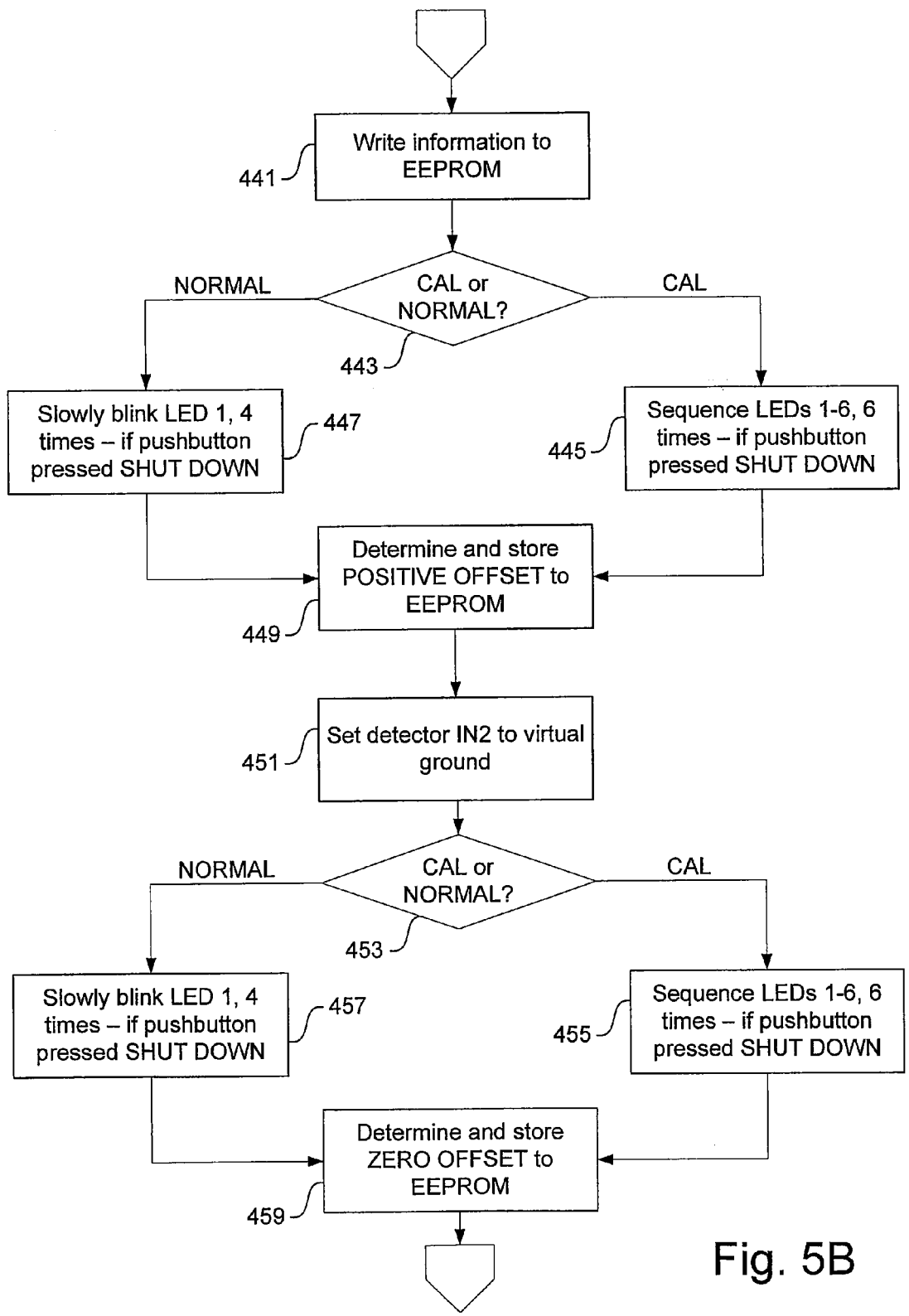
FIG. 5B illustrates a flow chart of an exemplary second part detailed noise dosimeter startup sequence, in accordance with an embodiment of the present invention.

FIG. 5B illustrates a flow chart of an exemplary second part noise dosimeter startup sequence, in accordance with an embodiment of the present invention. During a second part of the noise dosimeter startup sequence, the noise dosimeter gets data for minimizing errors in the system. Referring to FIG. 5A, measurement starts up at step 431, the startup sequence then proceeds to step 441 of FIG. 5B, where information is written to the EEPROM. The written information may comprise firmware version, exchange rate, criterion level, and threshold level. At a next decision step 443, it is determined whether the noise dosimeter is in CAL or NORMAL mode.

If it is determined at step 443 that the noise dosimeter is in CAL mode, LEDs 1 through 6 are then turned on in order 6 times at a next step 445. This particular lighting sequence causes a 3.6 second delay during which time the hardware settles. During this 3.6 second period, the voltage across capacitor 241 settles to near its proper value for the conditions at the input of the RMS detector. If the pushbutton is pressed during this time, the noise dosimeter shuts down. If no shutdown occurs, the sequence then proceeds to a next step 449.

If it is determined at step 443 that the noise dosimeter is in NORMAL mode, LED1 blinks slowly 4 times at a next step 447. This blinking of LED1 cause a 5.3 second delay during which time the hardware settles. During this 5.3 second period, the voltage across capacitor 241 settles to near its proper value for the conditions at the input of the RMS detector. If the pushbutton is pressed during this time, the noise dosimeter shuts down. If no shutdown occurs, the sequence then proceeds to a next step 449.

At step 449, the positive offset measurement is performed and positive offset data is stored to the EEPROM. At startup and during this step, the microphone is disabled and the RMS detector IN2 is set to virtual ground plus 20 mV. The RMS detector IN2 is then set to virtual ground at a next step 451.

If at step 453 the noise dosimeter is in CAL mode, LEDs 1 through 6 are turned on in order 6 times at a next step 455. This lighting sequence causes a 14.4 second delay during which time the hardware settles. During this 14.4 second period, the voltage across capacitor 241 settles to near its proper value for the conditions at the input of the RMS detector. If the pushbutton is pressed during this time, the noise dosimeter shuts down. If no shutdown occurs, the sequence then proceeds to a next step 459.

If at step 453 the noise dosimeter is in NORMAL mode, LED1 blinks slowly 4 times at a next step 457. The blinking of LED1 causes a 14.5 second delay during which time the hardware settles. During this 14.5 second period, the voltage across capacitor 241 settles to near its proper value for the conditions at the input of the RMS detector. If the pushbutton is pressed during this time, the noise dosimeter shuts down. If no shutdown occurs, the sequence then proceeds to a next step 459.

At step 459, the zero offset measurement is then determined and stored to the EEPROM. From step 451 through step 459, the microphone is off and the RMS detector input IN2 is set to virtual ground. The startup sequence then proceeds to the third part of the noise dosimeter startup sequence, described hereinafter.

Figure 5C:
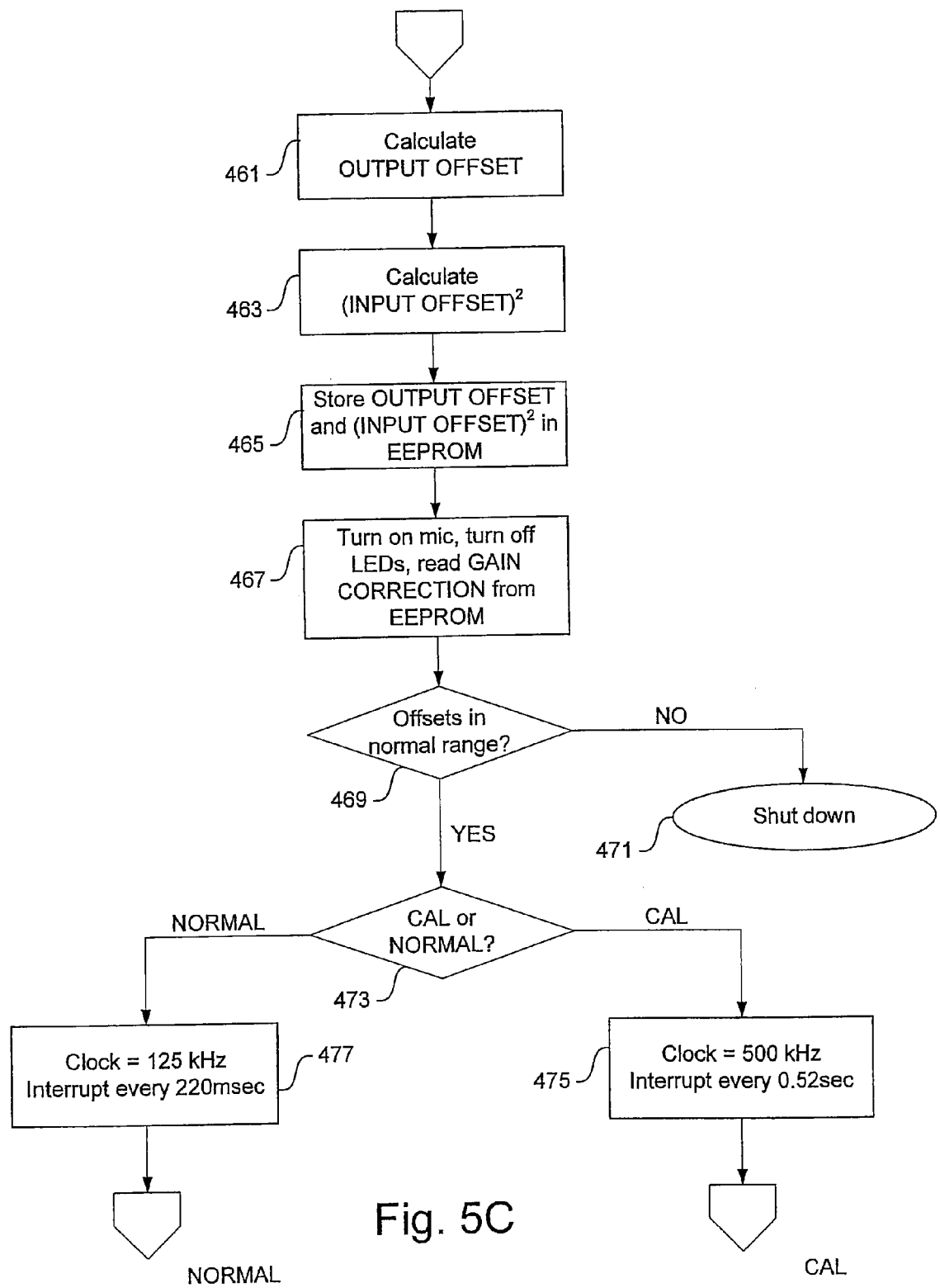
FIG. 5C illustrates a flow chart of an exemplary third part detailed noise dosimeter startup sequence, in accordance with an embodiment of the present invention.

FIG. 5C illustrates a flow chart of an exemplary third part noise dosimeter startup sequence, in accordance with an embodiment of the present invention. During a third part of the noise dosimeter startup sequence, the output and input offsets are calculated. Referring to FIG. 5B, the positive offset is determined at step 449 and the zero offset is determined at step 459, and the startup sequence then proceeds to step 461 of FIG. 5C, where the output offset is calculated. The output offset is the positive offset minus the ideal value which corresponds to zero signal input at the RMS detector. The calculated output offset is then used at a next step 463 as follows:

$$(\text{input offset})^2 = ((\text{zero offset}) - (\text{output offset}))^2$$

The output offset and the (input offset)$^2$ values are then stored in the EEPROM at a next step 465. The microphone is then enabled, the LEDs are turned off, and the gain correction value is read from EEPROM at a next step 467. At a following decision step 469, it is determined whether the offsets are in a normal range. If the offsets are not in a normal range, the noise dosimeter shuts down at a next step 471.

If the offsets are in a normal range, and the noise dosimeter is in CAL mode at step 473, the clock in the microcontroller is set to 500 kHz and interrupts begin to occur every 0.52 sec, at a next block 475. The noise dosimeter then proceeds to operate in CAL mode as discussed hereinafter in FIG. 6.

If the offsets are in a normal range, and the noise dosimeter is in NORMAL mode at step 473, the clock in the microcontroller is set to 125 kHz and interrupts begin to occur every 220 msec, at a next block 477. The noise dosimeter then proceeds to operate in NORMAL mode as discussed hereinafter in FIG. 7.

Figure 6:
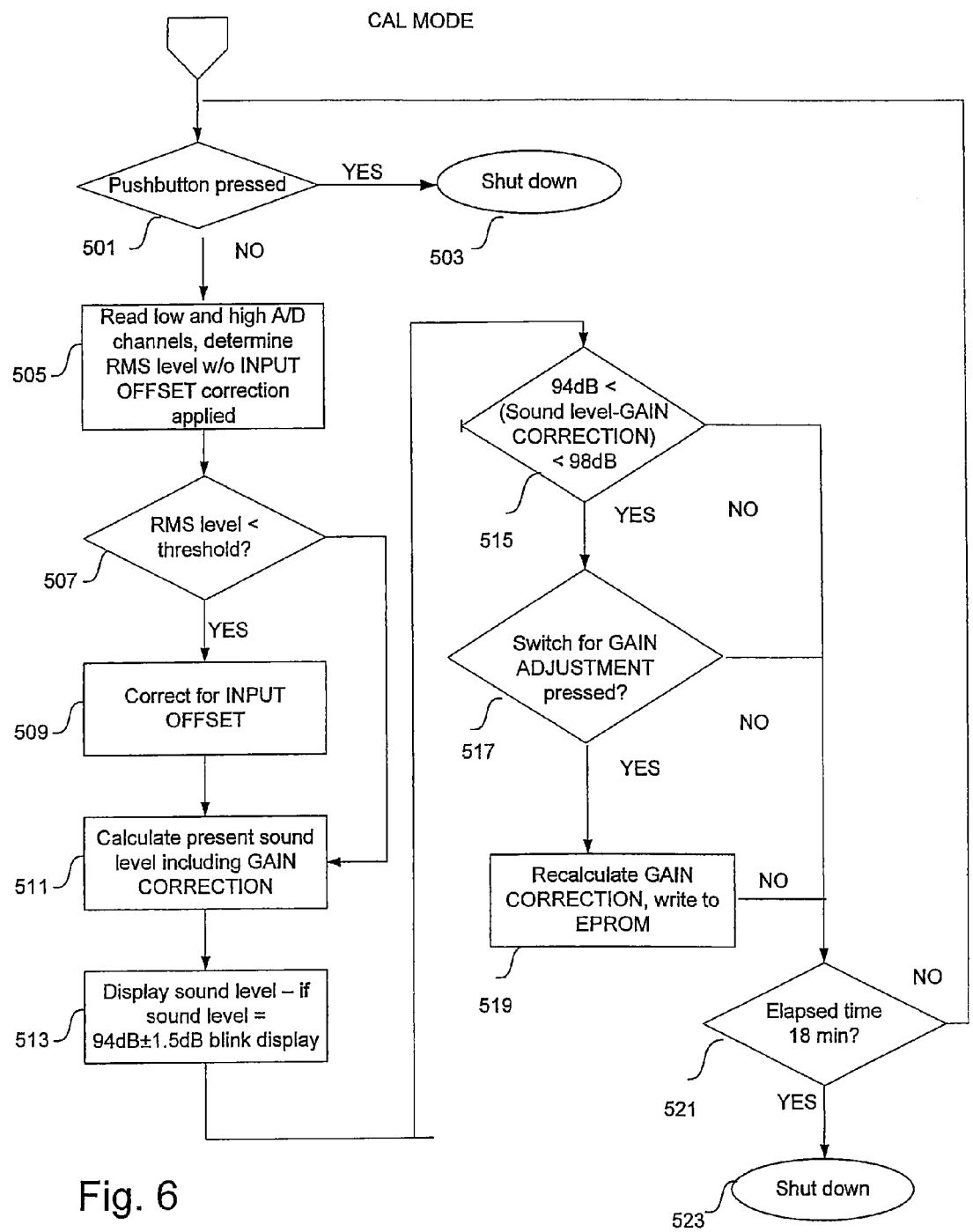
FIG. 6 illustrates a flow chart of an exemplary operation of a noise dosimeter in CAL mode, in accordance with an embodiment of the present invention.

FIG. 6 illustrates a flow chart of an exemplary operation of a noise dosimeter in CAL mode, in accordance with an embodiment of the present invention. At an initial step 501 a decision is made as to whether the pushbutton is pressed. If the pushbutton is pressed, the noise dosimeter is shut down at a next step 503.

If the pushbutton is not pressed, at a next step 505, the low and high A/D channels are read. For low level signals, less than, for example 99.9 dB, the low A/D channel is used to determine the RMS level and for high level signals the high A/D channel is used to determine the RMS level. Then the output offset is subtracted to determine the RMS level without the input offset correction applied. At a next decision step 507 it is determined whether the RMS level is smaller than a threshold for input offset correction. If the RMS level is not smaller than the threshold, the process proceeds to the next step 511.

If at the decision step 507 it is determined that the RMS level is smaller than the threshold, the input offset is corrected for by calculating the value SQRT[(RMS level)$^2$–(input offset)$^2$] at a next step 509. The process then proceeds to the next step 511.

At a next step 511, the present sound level is calculated in dB including gain correction. At a following step 513, if the sound level is 94 dB±1.5 dB then the display blinks both LED 3 and LED 4. At a next decision step 515, it is determined whether the sound level without gain correction is between 94 and 98 dB. If the sound level is not between 94 and 98 dB, the process then proceeds to a decision block 521.

If the sound level is between 94 and 98 dB, it is determined at a decision block 517 whether the switch for calibration (for example 225 of FIG. 2) is pressed. If the switch is not pressed, the process proceeds to the decision block 521.

If the switch is pressed, the gain correction is recalculated and written to the EEPROM at a next step 519. The process then proceeds to the decision block 521.

At the decision block 521 it is determined whether 18 minutes have elapsed. If 18 minutes have elapsed, the noise dosimeter shuts down at a next step 523. If 18 minutes have not elapsed, the process returns to the decision block 501.

During the CAL mode, every 0.52 sec an interrupt occurs, and the timer for the CAL mode shut off is incremented.

The CAL mode may serve several purposes. One purpose of the CAL mode may be for the user to view the current sound level from 70 dB to 130 dB in 5 dB increments (LED1 only: <72.5 dB; LED1+LED2: 72.5-77.5 dB; LED2 only: 77.5-82.5 dB, etc), as specified hereinabove in Table 2. Another purpose of the CAL mode may be for the user to check the calibration for microphone sensitivity (LED3 and LED4 both on together indicate 92.5-97.5 dB; however, if LED3 and LED4 are both on and blinking together, this indicates 94 dB±1.5 dB). Yet another purpose of the CAL mode may be for the manufacturer or service technician to readjust the microphone sensitivity GAIN CORRECTION by exposing the instrument to 94 dB SPL and pressing a pushbutton attached to the 10-pin connector described hereinabove.

In the CAL mode, the instrument measures and display the current sound level. CAL mode also allows a user to check the instrument calibration, and if an appropriate sound field is present the user may readjust the gain correction for microphone sensitivity. The instrument runs for approximately 18 minutes in CAL mode and automatically turn itself off.

Figure 7:
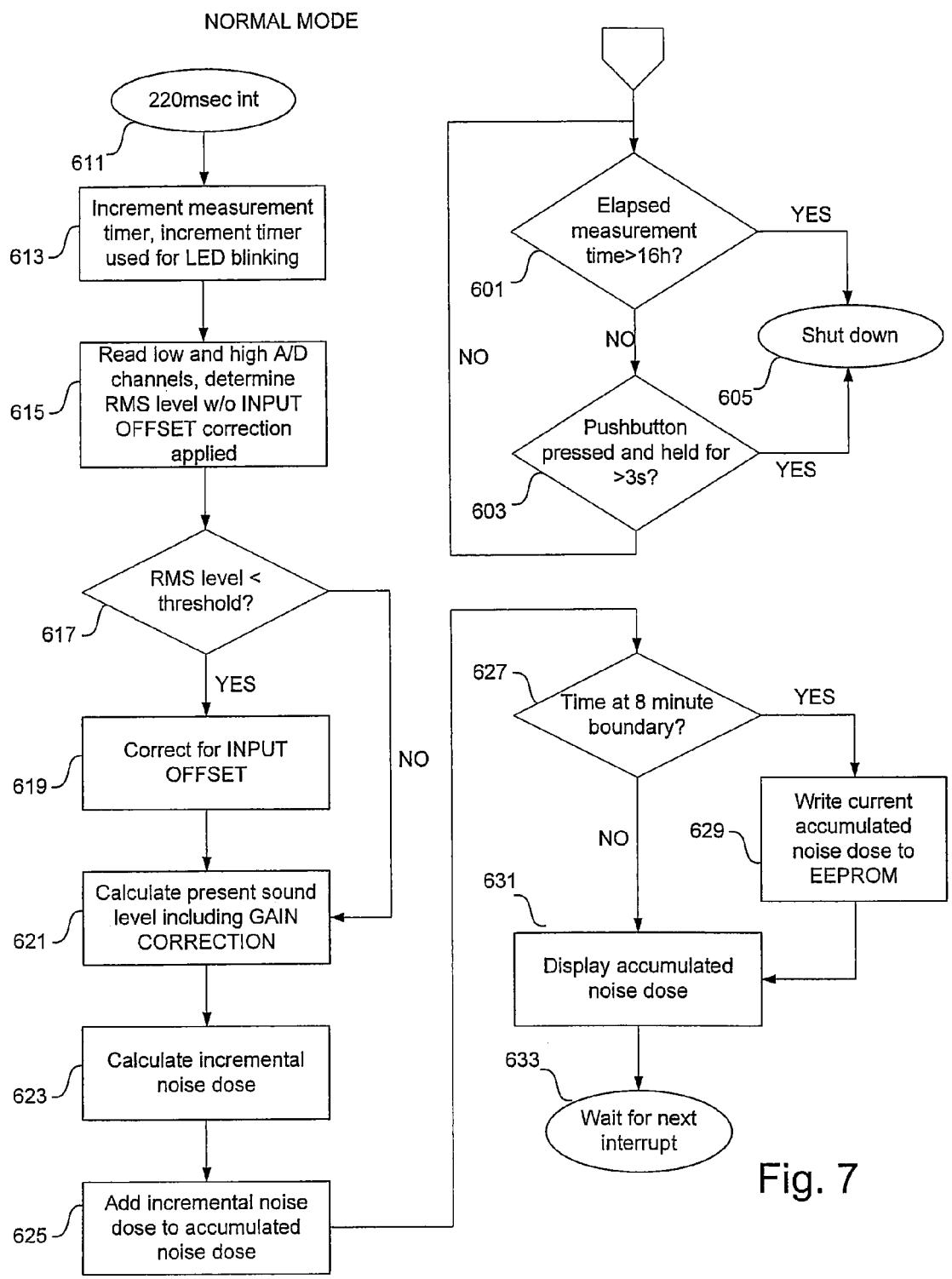
FIG. 7 illustrates a flow chart of an exemplary operation of a noise dosimeter in NORMAL mode, in accordance with an embodiment of the present invention.

FIG. 7 illustrates a flow chart of an exemplary operation of a noise dosimeter in NORMAL mode, in accordance with an embodiment of the present invention. At a decision block 601 it is determined whether elapsed measure time has exceeded 16 hours. If more than 16 hours have elapsed since the noise dosimeter has begun measuring noise dose, the noise dosimeter shuts down at a step 605. If less than 16 hours have elapsed since the noise dosimeter has begun measuring noise dose, it is determined whether the pushbutton has been pressed and held for more than 3 sec at a decision block 603. If the pushbutton has been pressed and held for more than 3 sec, the noise dosimeter is shut down at the step 605. If the push button has not been pressed and held for more than 3 sec, the process returns to decision block 601.

During the NORMAL mode, the noise dosimeter determines the sound level and calculates the noise dose once every approximately 220 msec. The display shows % dose according to, for example, ANSI S1.25-1991. 8 noise dose ranges may be indicated on the display, as discussed further hereinafter.

When an interrupt occurs every 220 msec at a step 611, a measurement timer is incremented and the increment timer is used both for LED blinking at a step 613 and for the determination of elapsed measurement time at a step 601. At a next step 615, the low and high A/D channels are read. For low level signals less than, for example 99.9 dB, the low A/D channel is used to determine the RMS level and for high signals the high A/D channel is used to determine the RMS level. Then the output offset is subtracted to determine the RMS level without the input offset correction applied. At a next decision step 617 it is determined whether the RMS level is smaller than a threshold for input offset correction. If the RMS level is not smaller than the threshold, the process proceeds to the next step 621.

If at the decision step 617 it is determined that the RMS level is smaller than the threshold, the effect of input offset is minimized by calculating the value SQRT[(RMS level)$^2$– (input offset)$^2$] at a next step 619. The process then proceeds to the next step 621.

At a next step 621, the present sound level is calculated in dB including gain correction. The incremental noise dose is then calculated with consideration of exchange rate and criterion level at a next step 623. The incremental noise dose is set to 0 for a sound level less than the criterion threshold. At a next step 625, the incremental noise dose is added to the accumulated noise dose. At a next decision step 627, it is determined whether the time is at a 8-minute boundary. If the time is at a boundary, the current accumulated noise dose is written to EEPROM at a next step 629. The process then proceeds to a next block 631.

If the time is not at a boundary, the process proceeds to a next step 631. At the step 631 the accumulated noise dose is displayed for the user. At a next step 633, the process returns until the 220 msec interrupt again occurs.

In the NORMAL mode, the noise dosimeter performs the noise dose calculation and displays its results. The noise dosimeter may run for up to 16 hours continually in NORMAL Mode and display results as specified by Table 1 hereinabove. The levels at which the indications occur may be changed in the firmware. During NORMAL mode operation, if the pushbutton is pressed and held down for about 2 seconds, for example, the measurement process is terminated. Data held in memory may be over-written the next time the unit is turned on in NORMAL mode, so if a user wishes to download the dose data to a computer, the user may wish to do so before starting another measurement.

The exchange rate, criterion level, criterion threshold level, criterion time, frequency weighting, and time weighting may be set according to ANSI S1.25-1991 as discussed earlier. The criterion and threshold levels may be easily changed. The noise dosimeter may be capable of exchange rates of 3 dB, 4 dB or 5 dB. The frequency weighting and time weighting may be implemented in hardware.

Every 8 minutes in NORMAL mode, for example, the instrument writes two bytes to its EEPROM representative of the present accumulated noise dose. In an embodiment of the invention, a 16-bit representation of accumulated noise dose has a resolution of approximately 0.2%. Thus an EEPROM value of 0001 hex represents an accumulated noise dose of approximately 0.2%, an EEPROM value of 0200 hex represents an accumulated noise dose of 100%, and the maximum EEPROM value of FFFF hex represents a noise dose of approximately 12800%.

The accumulated noise dose data may be written to EEPROM starting at address 00 hex and ending at address EF hex, 240 bytes total. Data from previous measurements may be overwritten and to ensure that the data can be properly interpreted, the last byte of accumulated noise dose data, which is written may be followed by FF hex.

Some information that also may be written to the EEPROM includes the firmware revision level, exchange rate as defined in the firmware, criterion level as defined in the firmware, threshold level as defined in the firmware, measured A/D levels (2 values, 2 bytes each) used in the auto-zero routine (for calculation of INPUT and OUTPUT offsets), calculated OUTPUT OFFSET (2 bytes), calculated (INPUT OFFSET)$^2$ (2 bytes), and calculated GAIN CORRECTION (2 bytes). This information may be written to EEPROM started at address F0 hex and ending at address FF hex, 16 bytes total.

One aspect of the present invention may be the method and apparatus of monitoring noise exposure being directed toward an unsophisticated user. The personal noise dosimeter may also be inexpensive, and it may have a form factor compatible with being worn in social situations.

Another aspect of the present invention may be that the internal circuitry may include hardware and firmware for extending the dynamic range of the RMS detector. Additionally, the internal circuitry may include non-volatile memory, which may be used to store the noise dose history.

Another aspect of the present invention may be the capability of controlling another device. For example, the present invention may be incorporated into a soundboard (e.g. mixer used in a rock concert). The soundboard controls the audio level in a concert hall, for example, and often the sound exceeds limits generally considered safe. Incorporating the present invention into a soundboard may alert the sound man as to the unacceptably high level and make a record of the unacceptably high level (noise dose history) for later evaluation and consideration.

Another aspect of the present invention may include outputs that can be used to control a device external to the dosimeter such as, for example, a soundboard. Such a feature may, for the soundboard example above, force the sound man to adjust the sound by having the output signals of the dosimeter coupled to circuitry which automatically reduces the sound level.

Numerous new digital processing components are available and affordable, and may be fit for use with the personal noise dosimeter. One example of these devices may be the dsPIC ("digital signal controller") devices manufactured by Microchip Technology. Another example may be Microchip's PIC16F684. The dsPIC part includes an analog to digital converter, and also incorporates specially designed digital signal processing capability. The PIC16F684, is a less expensive and less capable component, which includes an analog to digital converter, but is not designed for high throughput digital signal processing applications.

In one exemplary embodiment of the invention, a methodology may involve performing as much of the signal processing digitally as possible, thereby minimizing the complexity of the analog components of the dosimeter. In another exemplary embodiment of the invention, the analog and digital processing may be segmented. RMS level detection and frequency weighting may be provided in analog circuitry, and the remaining processing may be performed digitally.

This highly digital approach may be implemented using a dsPIC or a similar component. The dsPIC is capable of digitally processing audio. An external ADC may be used in conjunction with the dsPIC to improve the resolution of the analog to digital conversion.

Another approach may use a simpler microcontroller such as, for example, the PIC16F684. Using a simpler microcontroller may call for analog filtering and level detection for the noise monitoring system. This analog solution may be done using an analog circuitry external to the PIC. An important component may be a level detector, since sound level measurement is based on RMS level detection and such a component as the level detector may be used to achieve such a measurement in a noise monitoring system.

Several different types of RMS detectors are available by manufacturers such as Analog Devices and Linear Technology. U.S. Pat. No. 6,098,463 titled "Method and apparatus for measurement of wide dynamic range signals" provides an improved method for detection and subsequent signal processing in wide dynamic range measurement instruments.

In an embodiment of the present invention the PIC16F684 microcontroller and the Linear Technology LTC1966 RMS Detector may be utilized. A circuitry may be utilized to improve the performance of the LTC1966 at low levels to have a sufficient dynamic range. The output of the RMS Detector may be coupled to two independent amplifying circuits. The output of those amplifiers may be further coupled into two analog-to-digital converter channels incorporated into the PIC. The A/D converter in the PIC may be 10 bits, which may, along with the two-channel approach, enable sufficient resolution of conversion of the analog level to digital to cover the desired dynamic range.

Figure 8:
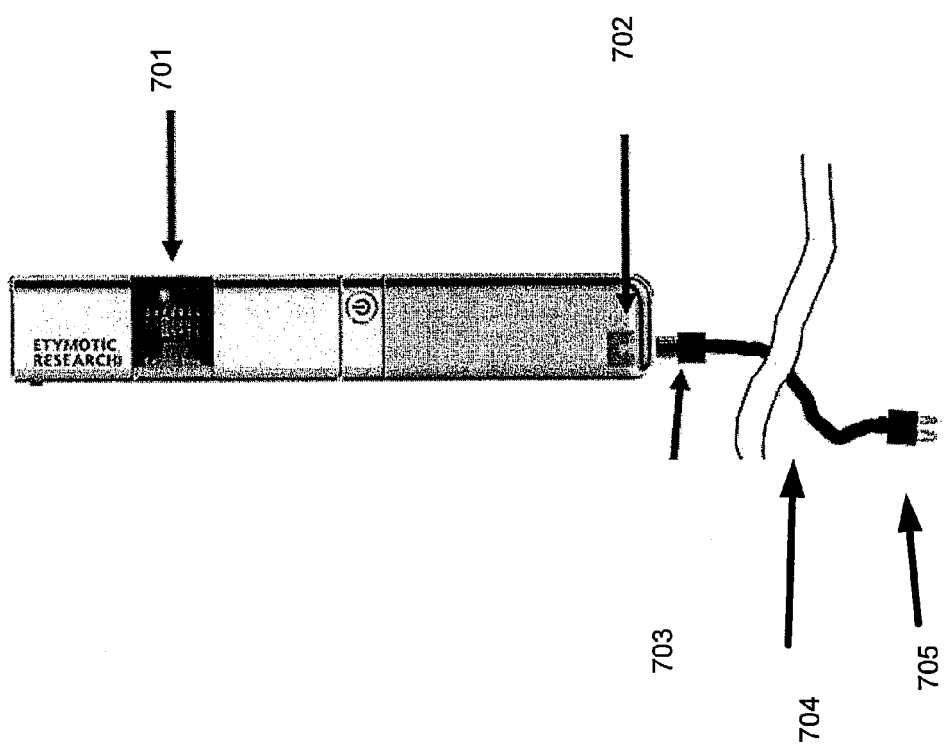
FIG. 8 illustrates a diagram of an exemplary personal noise dosimeter, in accordance with an embodiment of the present invention.

FIG. 8 illustrates a diagram of an exemplary personal noise dosimeter, in accordance with an embodiment of the present invention. The noise dosimeter 701 may be an exemplary embodiment of the present invention, where the noise dosimeter may comprise an auxiliary jack 702. The auxiliary jack may have multiple uses. A charging voltage may be available and may be provided to the noise dosimeter unit via the auxiliary jack 702. A cable 704 comprises a plug 703 which mates with the dosimeter's auxiliary jack 702 and a connector 705 which connects to a source of charging current. When charging current is detected through the auxiliary jack, a battery that is used as a power source in the noise dosimeter may begin charging. In such an embodiment, the noise dosimeter utilizes a rechargeable battery. During charging, the noise dosimeter may continue functioning in a normal course as prior to inserting the charging voltage.

Another embodiment of the invention is also illustrated with reference to FIG. 8. Noise dosimeter 701 may be used by those who wear earphones several hours a day and also work in noisy places. Such a device may be utilized so either total noise dose is determined in a work setting, or total noise dose is determined for the sound field under the earphone. In this embodiment, the auxiliary jack 702 may also be utilized to insert signals for measurement or calibration purposes. A signal supplied at connector 705 and available at plug 703 may be used the input signal to the noise dosimeter, instead of the microphone signal. When plug 703 is attached to the dosimeter at auxiliary jack 702, the microphone is disconnected, and the input signal supplied at connector 705 becomes the input signal for the dosimeter.

In an embodiment of the invention which utilizes the auxiliary jack, the noise dosimeter may not comprise a charging jack. In such an embodiment, regular batteries are utilized as the power source.

An embodiment of the invention which comprises an auxiliary input jack may be calibrated such that, for example, an input voltage of 20 mV RMS will produce the same result as the microphone input would when the microphone is exposed to 94 dB SPL. In order to ensure that a given earphone produces the proper result when presented with the earphone signal at its auxiliary input jack, an exact voltage calibration is performed. During this calibration, an analog attenuation of the earphone signal may be required to match the requirements of the dosimeter. The earphone calibration is based upon a voltage level for a given real-ear SPL. For example, a more sensitive earphone may produce 94 dB SPL at an input level of 20 mV RMS (or 108 dB at 100 mV input). In this case, there is a perfect match to the requirements of the dosimeter. The less sensitive earphone may produce 94 dB SPL for an input level of 450 mV RMS (or approximately 81 dB SPL at 100 mV input. Such an less sensitive earphone would then produce 94 dB for an input level of 447 mV RMS. Thus a noise dosimeter calibrated for an earphone which produces 94 dB at an input of 20 mV when configured for use with a dosimeter calibrated for an earphone which produces 94 dB at an input of 447 mV would require an attenuator of 29 dB between the earphone input and the dosimeter auxiliary input jack.

In an embodiment of the present invention, the noise dosimeter system may go through an automatic routine when started up, to extend the dynamic range of the RMS detector. In one embodiment of the invention the automatic routine at startup determines input and/or output offset voltages at the RMS detector or elsewhere in the circuit and stores correction factors to minimize the measurement errors caused by those offset voltages. During this routine, the processor turns off the microphone, thus preventing any audio signal from affecting the RMS detector.

In an embodiment of the present invention, alternative non-standard approaches to noise dose measurement may be employed. New standards for noise dose measurement are introduced from time to time by various researchers and by various standards organizations worldwide.

In an embodiment of the invention, repeating measurements over intervals longer and/or shorter than 16 hours may be employed. For example, 84 measurements each of 2 hour duration may be utilized to document noise exposure over an entire week, or 120 measurements each of 0.5 hour duration may be utilized to document noise exposure over an entire weekend.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A noise dosimeter for measuring an accumulated noise dose over time, comprising:
a microphone operable to convert an acoustic signal to an AC signal;

a root mean square (RMS) detector operable to receive the AC signal, convert the AC signal to a DC signal, and provide the DC signal at an output of the RMS detector;

a current source operable to inject current into the output of the RMS detector; and a processor operable to receive a DC signal representative of the output of the RMS detector, wherein the processor is operable to turn off the microphone when offset errors in the dosimeter are to be determined, the processor being further operable to calculate at least one offset of the RMS detector based on the DC signal received while the microphone is turned off.

2. The noise dosimeter of claim 1 wherein the current source comprises a resistor network.

3. The noise dosimeter of claim 1 wherein the current source is operable to inject about 20 nA of current into the output of the RMS detector.

4. The noise dosimeter of claim 1, further comprising circuitry operable to measure and account for offset errors in the RMS detector.

5. The noise dosimeter of claim 1, further comprising circuitry operable to measure and account for offset errors at an input of the RMS detector.

6. The noise dosimeter of claim 1 wherein the noise dosimeter is configured to be worn by a user.

7. A method of determining an offset voltage in a noise dosimeter having a microphone that provides an AC signal to a root mean square (RMS) detector, which converts the AC signal to a DC signal, the method comprising:

turning off the microphone when an offset is to be determined; and measuring a signal that is representative of an output of the RMS detector while the microphone is turned off.

8. The method of claim 7, further comprising calculating at least one offset of the dosimeter based on the measured signal.

9. The method of claim 8 further comprising minimizing errors due to the at least one offset.

10. The method of claim 7, further comprising calculating an input offset of the RMS detector based on the measured signal.

11. The method of claim 7, further comprising providing a DC offset voltage to an input of the RMS detector and measuring the signal that is representative of the RMS detector output while the DC offset voltage is being provided.

12. The method of claim 11, further comprising calculating an output offset of the RMS detector based on the signal measured while the DC offset voltage is being provided.

13. The method of claim 12 wherein calculating the output offset of the RMS detector comprises subtracting an ideal value from the signal measured while the DC offset voltage is being provided.

14. The method of claim 12 further comprising calculating an input offset of the RMS detector based on a difference between the output offset and the signal measured while the DC offset voltage is not being provided to the input of the RMS detector.

15. A noise dosimeter for measuring an accumulated noise dose over time, comprising:

an RMS detector operable to receive an AC signal representing an acoustic signal, convert the AC signal to a DC signal, and provide the DC signal at an output of the RMS detector;

a first amplifier receiving the output of the RMS detector and operable to amplify signals of all levels;

a second amplifier receiving an output of the first amplifier and operable to amplify relatively lower level signals, the second amplifier having a gain of approximately $2^n$, where n is a number greater than 4; and a processor comprising an analog-to-digital converter (A/D) having multiple channels, a first A/D channel receiving an output of the first amplifier, a second A/D channel receiving an output of the second amplifier, the processor being operable to calculate an accumulated noise dose based on the outputs of the analog-to-digital converter.

16. The noise dosimeter of claim 15 wherein the processor is operable to minimize a measurement error due to inaccuracy of the RMS detector.

17. The noise dosimeter of claim 15 further comprising a display coupled to the processor and operable to indicate an accumulated noise dose.

18. The noise dosimeter of claim 17 wherein the display comprises a panel of light-emitting diodes (LEDs), and wherein a predetermined LED is illuminated to indicate a predetermined level of noise exposure.

19. The noise dosimeter of claim 18 wherein the display comprises LEDs of different colors to indicate to the user the severity of the noise exposure condition.

20. The noise dosimeter of claim 15 wherein the noise dosimeter is configured to be worn by a user.

* * * * *

UNITED STATES PATENT AND TRADEMARK OFFICE
CERTIFICATE OF CORRECTION

| | | |
|---|---|---|
| PATENT NO. | : 7,882,743 B2 | Page 1 of 1 |
| APPLICATION NO. | : 11/643328 | |
| DATED | : February 8, 2011 | |
| INVENTOR(S) | : Jack Goldberg et al. | |

It is certified that error appears in the above-identified patent and that said Letters Patent is hereby corrected as shown below:

On the Title Page inventor Gregory A. Flamme's city of residence should be changed from "Portgage, MI" to --Portage, MI--

Signed and Sealed this
Twenty-ninth Day of March, 2011

David J. Kappos
*Director of the United States Patent and Trademark Office*

UNITED STATES PATENT AND TRADEMARK OFFICE
CERTIFICATE OF CORRECTION

PATENT NO. : 7,882,743 B2  
APPLICATION NO. : 11/643328  
DATED : February 8, 2011  
INVENTOR(S) : Jack Goldberg et al.

Page 1 of 1

It is certified that error appears in the above-identified patent and that said Letters Patent is hereby corrected as shown below:

Title Page, item (73), change Assignee from "Broadcom Corp." to "Etymotic Research, Inc."

Signed and Sealed this
Fifth Day of February, 2013

Teresa Stanek Rea
*Acting Director of the United States Patent and Trademark Office*